United States Patent
Mori et al.

(10) Patent No.: US 8,487,013 B2
(45) Date of Patent: Jul. 16, 2013

(54) PRODUCTION METHOD OF POROUS RESIN PARTICLE HAVING HYDROXYL GROUP

(75) Inventors: Kenjiro Mori, Osaka (JP); Tatsuya Konishi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 372 days.

(21) Appl. No.: 12/265,015

(22) Filed: Nov. 5, 2008

(65) Prior Publication Data
US 2009/0137692 A1 May 28, 2009

(30) Foreign Application Priority Data

Nov. 5, 2007 (JP) ................................. 2007-286834

(51) Int. Cl.
*C08J 9/28* (2006.01)

(52) U.S. Cl.
USPC .................. 521/64; 521/61; 521/62; 521/63; 521/65; 521/97; 521/146; 521/147; 521/149; 521/150; 524/457; 524/459; 524/475; 524/555; 524/800; 524/848

(58) Field of Classification Search
USPC ............. 521/64, 65, 61, 62, 63, 97, 146, 147, 521/149, 150; 524/457, 459, 475, 800, 848, 524/555

See application file for complete search history.

(56) References Cited

U.S. PATENT DOCUMENTS

| | | | |
|---|---|---|---|
| 4,360,651 A * | 11/1982 | Dinbergs | 526/88 |
| 4,458,066 A | 7/1984 | Caruthers et al. | |
| 5,492,960 A * | 2/1996 | Muehlbauer et al. | 524/457 |
| 5,985,944 A * | 11/1999 | Ishizaki et al. | 521/64 |
| 5,990,183 A * | 11/1999 | Kawano et al. | 521/64 |
| 6,335,438 B1 | 1/2002 | Fonnum | |
| 6,559,217 B1 | 5/2003 | Nordal et al. | |
| 2002/0076696 A1* | 6/2002 | Kawaguchi et al. | 435/6 |
| 2006/0205905 A1* | 9/2006 | Inaba et al. | 526/319 |

FOREIGN PATENT DOCUMENTS

| | | |
|---|---|---|
| CN | 1151334 A | 6/1997 |
| CN | 1352658 A | 6/2002 |
| JP | 52-23193 A | 2/1977 |
| JP | 58-210914 A | 12/1983 |
| JP | 5-86132 A | 4/1993 |
| JP | 2007145998 | 6/2007 |
| WO | 03/070777 A1 | 8/2003 |
| WO | 2005/095476 A1 | 10/2005 |

OTHER PUBLICATIONS

Extended European Search Report dated Feb. 5, 2009.
Merrifield, R. B., "Solid Phase Peptide Synthesis. I. The Synthesis of a Tetrapeptide", J. Am. Chem. Soc., vol. 85, Jul. 20, 1963, pp. 2149-2154.
Chine Office Action issued in corresponding Application No. 200810174430; dated Sep. 30, 2010.
Office Action issued May 3, 2011, in Chinese Application No. 200810174430.X.
Japanese Office Action issued in Application No. 2007-286834 dated May 30, 2012.
English-Language Translation for Japanese Office Action dated May 30, 2012 issued by the Japanese Patent Office in counterpart Japanese Patent Application No. 2007-286834.

* cited by examiner

*Primary Examiner* — John Cooney

(74) *Attorney, Agent, or Firm* — Sughrue Mion, PLLC

(57) ABSTRACT

The present invention relates to a method for producing a porous resin particle containing an aromatic vinyl compound-aromatic divinyl compound copolymer having a hydroxyl group, the method including: dissolving a monomer mixture containing an aromatic vinyl compound, an aromatic divinyl compound and a (meth)acrylic acid ester having one hydroxyl group within the molecule thereof, and a polymerization initiator in an organic solvent to obtain a solution containing the monomer mixture and the polymerization initiator; suspending the solution in water in the presence of a dispersion stabilizer; and performing a suspension copolymerization. The method of the invention is capable of easily producing a porous resin particle containing an aromatic vinyl compound-aromatic divinyl compound copolymer having a hydroxyl group, that is used as a support for solid phase synthesis and enables efficient nucleic acid synthesis.

2 Claims, No Drawings

PRODUCTION METHOD OF POROUS RESIN PARTICLE HAVING HYDROXYL GROUP

FIELD OF THE INVENTION

The present invention relates to a production method of a porous resin particle containing an aromatic vinyl compound-aromatic divinyl compound copolymer having a hydroxyl group.

BACKGROUND OF THE INVENTION

A solid phase synthesis method used for the chemical synthesis of a peptide, a nucleic acid and the like is a method where amino acids or nucleotide units are bound one by one with using a support for solid phase synthesis as the scaffold of reaction to thereby obtain a substance having an objective sequence.

Conventionally, a nonporous, high-swelling, low-crosslinked polystyrene particle has been generally used as the support for solid phase synthesis of a peptide (see, Non-Patent Document 1). On the other hand, in the case of solid phase synthesis of a nucleic acid, for example, since the diffusion rate of the synthesis reagent (e.g., nucleoside phosphoramidite) in such a support is slow to cause bad efficiency of the nucleic acid synthesis, a non-swelling porous glass particle (CPG; controlled pore glass) or silica gel having a large specific area has been heretofore used (see, Patent Document 1). In the case of using CPG or silica gel for the nucleic acid synthesis, an amino group is firstly introduced into the particle surface by using a silane coupling agent (e.g., aminopropyltriethoxysilane), and then nucleoside having a degradable linker for the cleavage of a nucleic acid is bound to the amino group. The nucleic acid synthesis is performed, for example, by a phosphoramidite method using this nucleoside linker-bound CPG as a starting material.

However, with recent development of nucleic acid pharmaceuticals, there is required a support for solid phase synthesis, that allows for synthesis of a larger amount of nucleic acid. Since the above-described non-swelling CPG has a limit in the specific surface area and is difficult to increase the synthesis rate, a crosslinked polystyrene particle which is porous and swellable has been developed according to the purpose (see, Patent Document 2). However, a support for solid phase synthesis, that enables synthesis of a nucleic acid with higher purity in a higher yield and realizes good cost performance, has been demanded.

Furthermore, also in using the crosslinked polystyrene particle for the nucleic acid synthesis, similarly to the CPG or silica gel, it is necessary to introduce a functional group such as amino group or hydroxyl group to a surface of the polystyrene particle in order for the binding between a nucleoside linker and the polystyrene particle. For example, there are a method including producing a copolymer particle by the copolymerization of styrene, divinylbenzene and chloromethylstyrene, and then treating the copolymer particle with ammonia to introduce an amino group, and a method including producing a copolymer particle by the copolymerization of styrene, divinylbenzene and acyloxystyrene, and then hydrolyzing the copolymer particle to introduce a hydroxyl group (see, Patent Documents 3 to 5). However, in either of these methods, the process is cumbersome.

Non-Patent Document 1: R. B. Merrifield, *J. Am. Chem. Soc.*, 85, 2149, 1963
Patent Document 1: U.S. Pat. No. 4,458,066
Patent Document 2: U.S. Pat. No. 6,335,438
Patent Document 3 JP-A-58-210914
Patent Document 4: JP-A-52-023193
Patent Document 5: JP-A-5-086132

SUMMARY OF THE INVENTION

An object of the present invention is to provide a method of easily producing a hydroxyl group-containing support for solid phase synthesis, that enables efficient nucleic acid synthesis, that is, synthesis of a nucleic acid with high purity at a high synthesis rate.

According to the present invention, there is provided a method for producing a porous resin particle containing an aromatic vinyl compound-aromatic divinyl compound copolymer having a hydroxyl group, the method including: dissolving a monomer mixture containing an aromatic vinyl compound, an aromatic divinyl compound and a (meth)acrylic acid ester having one hydroxyl group within the molecule thereof, and a polymerization initiator in an organic solvent to obtain a solution containing the monomer mixture and the polymerization initiator; suspending the solution in water in the presence of a dispersion stabilizer; and performing a suspension copolymerization.

According to the present invention, in the above-mentioned method, the (meth)acrylic acid ester having one hydroxyl group within the molecule thereof is preferably contained in a proportion of 0.2 to 30 wt % and the aromatic divinyl compound is preferably contained in a proportion of 2 to 30 wt % in the monomer mixture. Furthermore, the (meth)acrylic acid ester having one hydroxyl group within the molecule thereof is preferably at least one member selected from the group consisting of 2-hydroxypropyl (meth)acrylate, 4-hydroxybutyl (meth)acrylate and 2-hydroxy-3-phenoxypropyl (meth)acrylate. Moreover, the organic solvent is preferably used within a range from 1 to 3 times in terms of the weight ratio based on the monomer mixture.

According to the present invention, a porous resin particle containing an aromatic vinyl compound-aromatic divinyl compound copolymer having a hydroxyl group, which is used as a support for solid phase synthesis and enables efficient nucleic acid synthesis, can be easily produced.

DETAILED DESCRIPTION OF THE INVENTION

The method for producing a porous resin particle containing an aromatic vinyl compound-aromatic divinyl compound copolymer having a hydroxyl group includes: dissolving a monomer mixture containing an aromatic vinyl compound, an aromatic divinyl compound and a (meth)acrylic acid ester having one hydroxyl group within the molecule thereof, and a polymerization initiator in an organic solvent to obtain a solution containing the monomer mixture and the polymerization initiator; suspending the solution in water in the presence of a dispersion stabilizer; and performing a suspension copolymerization.

In the present invention, examples of the aromatic vinyl compound include, but are not limited to, styrene, a nucleus alkyl-substituted styrene such as o-methylstyrene, m-methylstyrene, p-methylstyrene, 2,4-dimethylstyrene, ethylstyrene and p-tert-butylstyrene, an α-alkyl-substituted styrene such as α-methylstyrene and α-methyl-p-methylstyrene, and a nucleus halogenated styrene such as chlorostyrene. According to the present invention, styrene is preferably used among all as the aromatic vinyl compound.

In the present invention, examples of the aromatic divinyl compound include, but are not limited to, a nucleus alkyl-substituted divinylbenzene such as divinylbenzene and methyldivinylbenzene. Among all, divinylbenzene may be preferably used. As for the divinylbenzene, o-, m- or p-divinylbenzene or a mixture thereof may be used.

In the present invention, the (meth)acrylic acid ester having one hydroxyl group within the molecule thereof is represented by the formula (I):

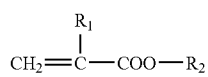

(I)

(wherein $R_1$ represents a hydrogen atom or a methyl group, and $R_2$ represents an alkyl group having a carbon number of 2 to 6, which has one hydroxyl group and may have a halogen atom or a phenoxy group).

Specific examples of the (meth)acrylic acid ester having one hydroxyl group within the molecule thereof, which is represented by the above formula (I), include 2-hydroxyethyl acrylate, 2-hydroxyethyl methacrylate, 2-hydroxypropyl acrylate, 2-hydroxypropyl methacrylate, 4-hydroxybutyl acrylate, 4-hydroxybutyl methacrylate, 2-hydroxy-3-phenoxypropyl acrylate and 3-chloro-2-hydroxypropyl methacrylate. Among all, in the present invention, 4-hydroxybutyl acrylate and 2-hydroxy-3-phenoxypropyl acrylate are preferred.

In the suspension copolymerization of a monomer mixture containing an aromatic vinyl compound, an aromatic divinyl compound and a (meth)acrylic acid ester having one hydroxyl group within the molecule thereof, the proportion of the (meth)acrylic acid ester having one hydroxyl group within the molecule thereof in the monomer mixture is usually 0.2 to 30 wt %, and preferably from 5 to 20 wt %. If the proportion occupied in the monomer mixture by the (meth)acrylic acid ester having one hydroxyl group within the molecular thereof is less than 0.2 wt %, the amount of the hydroxyl group contained in the porous resin particle containing the obtained copolymer is too small and, for example, when used as a support for solid phase synthesis, the amount of the synthesis reaction product to be obtained becomes small. On the other hand, if the proportion occupied in the monomer mixture by the (meth)acrylic acid ester having one hydroxyl group within the molecular thereof exceeds 30 wt %, when used, for example, as a support for solid phase synthesis, the density of the hydroxyl group in the porous resin particle to be obtained is excessively high and chemical reactions occurring in spatial adjacency to each other are mutually inhibited, as a result, the synthesis reaction product to be obtained is reduced in the purity.

The proportion of the aromatic divinylbenzene compound in the monomer mixture is usually 2 to 30 wt %, and preferably from 2 to 20 wt %. If the proportion occupied in the monomer mixture by the aromatic divinylbenzene compound is less than 2 wt %, the specific surface area of the porous resin particle containing the copolymer to be obtained is extremely small and, for example, when used as a support for solid phase synthesis, the amount of the synthesis reaction product to be obtained becomes small. On the other hand, if the proportion occupied in the monomer mixture by the aromatic divinylbenzene compound exceeds 30 wt %, when used, for example, as a support for solid phase synthesis, the swelling of the porous resin particle to be obtained in an organic solvent is inhibited and therefore, the amount of the synthesis reaction product to be obtained is reduced.

In the present invention, the suspension copolymerization of the monomer mixture containing an aromatic vinyl compound, an aromatic divinyl compound and a (meth)acrylic acid ester having one hydroxyl group within the molecule thereof may be performed by a conventionally known normal method. Accordingly, for example, there may be employed a method where the monomer mixture and a polymerization initiator are dissolved in an organic solvent, a dispersion stabilizer is separately dissolved in water, these two solutions are subsequently mixed and stirred in a nitrogen stream, the solution obtained by dissolving the monomer mixture and the polymerization initiator in the organic solvent is whereby dispersed as fine droplets in water, and after raising the temperature, the polymerization reaction is performed under stirring. The copolymerization reaction may be usually performed under stirring at a reaction temperature of 60 to 90° C. for 0.5 to 48 hours, but the reaction conditions of copolymerization are not limited thereto.

In the present invention, at least one member selected from the group consisting of a hydrocarbon and an alcohol is used as the organic solvent. In the present invention, the hydrocarbon includes an aliphatic hydrocarbon and an aromatic hydrocarbon, and the aliphatic hydrocarbon may be either saturated or unsaturated but is preferably an aliphatic saturated hydrocarbon having a carbon number of 5 to 12 or an alkylbenzene. Examples of the aliphatic saturated hydrocarbon having a carbon number of 5 to 12 include n-hexane, n-heptane, n-octane, isooctane, undecane and dodecane. Examples of the alkylbenzene include toluene.

The alcohol is preferably an aliphatic alcohol, more preferably an aliphatic alcohol having a carbon number of 5 to 12. Specific preferred examples thereof include 2-ethylhexyl alcohol, tert-amyl alcohol, nonyl alcohol, 2-octanol, decanol, lauryl alcohol and cyclohexanol.

According to the present invention, a mixture of the above-described hydrocarbon and alcohol is preferably used as the organic solvent for dissolving the monomer mixture and a polymerization initiator therein, so that the porous resin particle to be obtained can have a large specific surface area. In the mixture of the hydrocarbon and the alcohol, the weight ratio of hydrocarbon carbon/alcohol is usually from 1/9 to 6/4, though this may vary depending on the specific combination of the hydrocarbon and the alcohol used.

The organic solvent is usually used in a weight ratio of organic solvent/monomer of 1 to 3, preferably from 1.2 to 2. If the weight ratio of organic solvent/monomer is outside the above-mentioned range, in either case, the specific surface area of the porous resin particle to be obtained becomes small and, for example, when used as a support for solid phase synthesis, the amount of the synthesis reaction product through a chemical reaction is reduced.

The dispersion stabilizer is not particularly limited, and an arbitrary dispersion stabilizer may be used so long as it is conventionally used as a dispersion stabilizer in suspension polymerization. Examples of the dispersion stabilizer include a hydrophilic protective colloid agent such as polyvinyl alcohol, polyacrylic acid, gelatin, starch and carboxylmethyl cellulose; and a hardly-soluble inorganic powder such as calcium carbonate, magnesium carbonate, calcium phosphate, barium sulfate, calcium sulfate and bentonite. Although not particularly limited, the amount of the dispersion stabilizer used is preferably 0.01 to 10 wt % based on the water used in the suspension polymerization. If the amount of the dispersion stabilizer is less than 0.01 wt % based on the water used in the suspension polymerization, the stability of suspension polymerization is impaired and a large amount of an aggregate is produced. On the other hand, if the amount of the dispersion stabilizer exceeds 10 wt % based on the water used in the suspension polymerization, for example, a large number of particles which are too fine to use as a support for solid phase synthesis may be produced.

Further, the polymerization initiator for use in the suspension polymerization is not particularly limited, and an arbitrary polymerization initiator may be used so long as it is conventionally used as a polymerization initiator in suspension polymerization. Examples of the polymerization initiator include a peroxide such as dibenzoyl peroxide, dilauroyl peroxide, distearoyl peroxide, 1,1-di(tert-butylperoxy)-2-methylcyclohexane, 1,1-di(tert-hexylperoxy)-3,3,5-trimethylcyclohexane, 1,1-di(tert-hexylperoxy)cyclohexane, 1,1-di(tert-butylperoxy)cyclohexane, di-tert-hexyl peroxide, tert-butylcumyl peroxide, di-tert-butyl peroxide, 1,1,3,3-tetramethylbutylperoxy-2-ethylhexanoate, tert-hexylperoxy-2-ethylhexanoate, tert-butylperoxy-2-ethylhexanoate and tert-butylperoxyisopropyl monocarbonate; and an azo compound such as 2,2'-azobisisobutyronitrile, 2,2'-azobis-2-methylbutyronitrile and 2,2'-azobis-2,4-dimethylvaleronitrile.

As described above, the organic solvent in which the monomer mixture and the polymerization initiator are dissolved is suspended in water and subjected to suspension copolymerization to precipitate a copolymer. Thereafter, the copolymer is purified by washing to remove monomers remaining in the copolymer and impurities such as organic solvent, dispersion stabilizer and polymerization initiator. The solvent for washing is not particularly limited so long as it is a solvent useful for the removal of those impurities, but water, methanol, ethanol, acetonitrile, acetone, toluene, hexane, tetrahydrofuran or the like is usually used. For washing the obtained copolymer, this may be attained, for example, by suction-filtering the liquid dispersion of the copolymer after suspension copolymerization, washing the resulting copolymer with stirring in the solvent for washing, and repeating the operation of suction-filtering and subsequent washing of the copolymer in a similar manner. In the process of this washing, the system may be heated, if necessary, to remove volatile impurities in the copolymer.

According to the present invention, the objective porous resin particle containing a copolymer of an aromatic vinyl compound, an aromatic divinyl compound and a (meth) acrylic acid ester having one hydroxyl group within the molecule thereof can be obtained in this way but, if desired, the porous resin particle may be further subjected to an optional treatment such as drying or classification.

The thus-obtained porous resin particle can be suitably used as a support for solid phase synthesis to synthesize, for example, oligonucleotide. Incidentally, the oligonucleotide synthesis using the porous resin particle according to the present invention as a support for solid phase synthesis can be performed by a conventionally known method. For example, a linker is bound to the hydroxy group of the porous resin particle of the present invention, and amidite units are then bound one by one to give a predetermined base sequence from the end of the linker. This synthesis reaction can be performed using an automatic synthesis apparatus. For example, a linker-bound porous resin particle is packed in a flow-type reactor of the apparatus, various organic solvents such as acetonitrile and an amidite solution are sequentially fed thereto, and the reaction is repeated. Finally, the linker portion is cut off by hydrolysis or the like, whereby the objective oligonucleotide can be obtained. As for the linker, a conventionally known linker is appropriately used. For example, the oligonucleotide can be synthesized by binding a nucleoside linker having a structure shown below to the porous resin particle of the present invention.

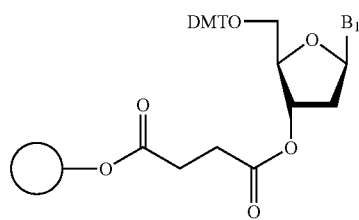

Herein, in the above-described structural formula, the circle represents the porous resin particle containing an aromatic vinyl compound-aromatic divinyl compound copolymer having a hydroxyl group, which is obtained by the method of the present invention, DMT represents a protective dimethoxytrityl group at the 5'-position, and $B_1$ represents a base.

EXAMPLES

The present invention is described below by referring to Examples, but the present invention is not limited to these Examples.

Example 1

A 500 mL-volume separable flask equipped with a condenser, a stirrer and a nitrogen inlet tube was dipped in a constant temperature water bath, and 2.5 g of polyvinyl alcohol (produced by Kuraray Co., Ltd.) and 250 g of distilled water were charged thereto and dissolved with stirring at 300 rpm to prepare an aqueous polyvinyl alcohol solution. Separately, a solution containing 49 g of styrene, 3 g of 2-hydroxypropyl methacrylate, 8 g of divinylbenzene (content: 55 wt %), 55 g of 2-ethylhexanol, 25 g of isooctane and 1 g of benzoyl peroxide (25 wt % aqueous product) was prepared.

This solution was added to the aqueous polyvinyl alcohol solution prepared above and after stirring at a stirring rate of 500 rpm in a nitrogen stream at room temperature, suspension copolymerization was performed for 8 hours by raising the temperature to 80° C. The particulate copolymer thus obtained was washed by filtration using distilled water and acetone and then dispersed in acetone in a vessel to make a total amount of about 1 L. This liquid dispersion was then allowed to stand still until the copolymer particle was precipitated so that the precipitate on the vessel bottom was not disturbed even when the vessel was tilted, and the supernatant acetone was then removed. The operation of again adding acetone to the vessel to make a total amount of about 500 mL, allowing the liquid dispersion to stand still as above, and then removing the supernatant acetone was repeated 10 times or more, thereby classifying the copolymer particles. The resulting copolymer particle liquid dispersion was filtered, and the copolymer particle thus obtained was dried under reduced pressure to obtain a porous resin particle composed of a styrene-2-hydroxypropyl methacrylate-divinylbenzene copolymer, as powder.

The porous resin particle thus obtained was subjected to the following analyses.

(Median Diameter)

The median diameter was measured by a laser diffraction/scattering method (a laser diffraction/scattering particle size distribution analyzer, LA-920, manufactured by Horiba Ltd.).

(Average Pore Diameter)

The average pore diameter was measured by a mercury penetration method (a mercury porosimeter, PoreMater 60GT, manufactured by Quantachrome Instruments).

(Amount of Hydroxyl Group)

The amount of hydroxyl group was measured by titration according to JIS K 0070. That is, the hydroxyl group of the porous resin particle to be measured was acetylated with a known amount of an acetylation reagent (acetic anhydride/pyridine), and the amount of the acetic anhydride not consumed in the actylation was determined by titration using potassium hydroxide, whereby the amount of the hydroxyl group in the sample was calculated. More specifically, the acetylation reagent was prepared by adding pyridine to 25 g of acetic anhydride to make a total amount of 100 mL, from 0.5 to 2 g of the measurement sample (dried porous resin particle) was weighed in a flask, and 0.5 mL of the acetylation reagent and 4.5 mL of pyridine were exactly added to the flask. The mixture in the flask was kept at 95 to 100° C. for 2 hours and then allowed to cool to room temperature, and 1 mL of distilled water was added thereto. After heating for 10 minutes, the acetic anhydride which was not consumed in the acetylation was decomposed. The entire content in the flask was transferred to a beaker, diluted with distilled water to a total amount of 150 mL and then titrated with an aqueous 0.5 N potassium hydroxide solution. Separately, a blank was measured by the same operation as above without charging the measurement sample.

The amount of the hydroxyl group in the measurement sample was determined according to the following formula:

$$A = (B - C) \times 0.5 \text{ (mol/L)} \times f \times 1000 \div M$$

wherein A (μmol/g) is the amount of the hydroxyl group in the sample, B (mL) is the titer of the aqueous potassium hydroxide solution when measuring a blank, C (mL) is the titer of the aqueous potassium hydroxide solution when measuring the measurement sample, f is the factor of the aqueous potassium hydroxide solution, and M (g) is the weight of the sample.

As a result of the measurement, the median diameter was 77 μm, the average pore diameter was 15 nm, and the amount of the hydroxyl group was 280 μmol/g.

Example 2

A porous resin particle composed of a styrene-2-hydroxy-3-phenoxypropyl acrylate-divinylbenzene copolymer was obtained as powder in the same manner as in Example 1 except that in Example 1, 47 g of styrene, 6 g of 2-hydroxy-3-phenoxypropyl acrylate and 7 g of divinylbenzene (content: 55 wt %) were used as monomers and 63 g of 2-ethylhexanol and 27 g of isooctane were used as organic solvents. The obtained porous resin particle was analyzed in the same manner as in Example 1, and as a result, the median diameter was 85 μm, the average pore diameter was 26 nm, and the amount of the hydroxyl group was 360 μmol/g.

Example 3

A porous resin particle composed of a styrene-4-hydroxybutyl acrylate-divinylbenzene copolymer was obtained as powder in the same manner as in Example 1 except that in Example 1, 47 g of styrene, 6 g of 4-hydroxybutyl acrylate and 7 g of divinylbenzene (content: 55 wt %) were used as monomers and 70 g of 1-decanol was used as an organic solvent. The obtained porous resin particle was analyzed in the same manner as in Example 1, and as a result, the median diameter was 75 μm, the average pore diameter was 24 nm, and the amount of the hydroxyl group was 590 μmol/g.

Reference Example 1

(Binding of Nucleoside Succinate Linker)

The porous resin particle obtained in Example 2 was bound with DMT-dT-3'-succinate linker (5'-O-dimethoxytrityl-tymidine-3'-succinate trimethylammonium salt) for the synthesis of oligonucleotide. That is, 1 g of the dried porous resin particle, 0.15 g of DMT-dT-3'-succinate linker, 0.09 g of HBTU (2-(1H-benzotriazol-1-yl)-1,1,3,3-tetramethyluronium hexafluorophosphate), 0.09 mL of N,N-diisopropylethylamine and 10 mL of acetonitrile were put in a 50 mL-volume glass vessel and mixed, and the reaction was allowed to proceed with stirring at room temperature for 12 hours. After the completion of reaction, the obtained reaction mixture was washed with acetonitrile, filtered and then dispersed in acetonitrile to make a total amount of 25 mL and thereto, 5 mL of CAP-A (20% acetic anhydride/80% acetonitrile), 2.5 mL of CAP-B (20% N-methylimidazole/30% pyridine/50% acetonitrile) and 0.025 g of 4-dimethylaminopyridine were added and mixed. The reaction was allowed to proceed with stirring at room temperature for 6 hours and after the completion of reaction, the obtained reaction mixture was washed with acetonitrile, filtered and then dried under reduced pressure to obtain a DMT-dT-3'-succinate linker-added porous resin particle. The addition amount of the DMT-dT-3'-succinate linker was 60 μmol/g.

(Synthesis of Oligonucleotide)

The DMT-dT-3'-succinate linker-added porous resin particle obtained above was packed in a column for synthesis, the column was set in an Applied Biosystems 3400 DNA synthesizer, and oligonucleotide dT20 (oligonucleotide of thymine 20 base) was synthesized under the conditions of a synthesis scale of 1 μmol and DMT-off. Cleavage and deprotection of oligonucleotide from the porous resin particle were performed by a reaction using concentrated aqueous ammonia at 55° C. for 12 hours. The OD yield of the obtained oligonucleotide as determined by ultraviolet absorbance measurement (260 nm) is shown in Table 1.

The proportion of full length nucleotide (oligonucleotide with a 20 base sequence) as determined by HPLC measurement (Alliance UV System manufactured by Waters Corp., Hydrosphere C18 manufactured by YMC) is shown in Table 1.

Reference Example 2

(Binding of Nucleoside Succinate Linker)

The porous resin particle obtained in Example 3 was bound with DMT-dT-3'-succinate linker in the same manner as in Reference Example 1 to obtain a DMT-dT-3'-succinate linker-added porous resin particle. The addition amount of the DMT-dT-3'-succinate linker was 127 μmol/g.

(Synthesis of Oligonucleotide)

Oligonucleotide dT20 was synthesized in the same manner as in Reference Example 1 by using the DMT-dT-3'-succinate linker-added porous resin particle obtained above. The OD yield of oligonucleotide and the proportion of full length nucleotide, which were determined in the same manner as in Reference Example 1, are shown in Table 1.

Comparative Example 1

(Preparation of Porous Resin Particle)

A porous resin particle composed of a styrene-p-acetoxystyrene-divinylbenzene copolymer was obtained as powder in the same manner as in Example 1 except that in Example 1, 48 g of styrene, 3.5 g of p-acetoxystyrene and 7 g of divinylbenzene (content: 55 wt %) were used as monomers and 52 g of 2-ethylhexanol and 23 g of isooctane were used as organic solvents.

A 500 mL-volume separable flask equipped with a condenser and a stirrer was dipped in a constant temperature water bath, and 20 g of the porous resin particle obtained above, 100 g of ethanol and 50 g of an aqueous sodium hydroxide solution (5 wt %) were charged thereinto. After stirring at a stirring rate of 400 rpm, hydrolysis reaction was performed over 12 hours by raising the temperature to 75° C. The obtained solution was neutralized and then washed by filtration using distilled water and acetone. The obtained porous resin particle was dried under reduced pressure to obtain a porous resin particle composed of a styrene-4-hydroxystyrene-divinylbenzene copolymer.

The obtained porous resin particle was analyzed in the same manner as in Example 1, and as a result, the median diameter was 86 μm, the average pore diameter was 33 nm, and the amount of the hydroxyl group was 422 μmol/g.

(Synthesis of Oligonucleotide)

DMT-dT-3'-Succinate linker-added porous resin particles (addition amount: 54 μmol/g and 150 μmol/g) were prepared in the same manner as in Reference Example 1, and oligonucleotide dT20 was synthesized using each porous resin particle. The OD yield of oligonucleotide and the proportion of full length nucleotide, which were determined in the same manner as in Reference Example 1, are shown in Table 1.

TABLE 1

|  | Reference Example 1 | Reference Example 2 | Comparative Example 1 | |
|---|---|---|---|---|
| DMT-dT-3'-Succinate linker addition amount (μmol/g) | 60 | 127 | 54 | 150 |
| OD yield of oligonucleotide (OD/μmol) | 156 | 149 | 122 | 122 |
| Proportion of full length oligonucleotide (%) | 89 | 89 | 87 | 89 |

As can be seen from comparison between oligonucleotide obtained using the porous resin particle of Reference Example 1 (linker addition amount: 60 μmol/g) and oligonucleotide obtained using the porous resin particle of Comparative Example 1 (linker addition amount: 54 μmol/g), the OD yield (synthesis yield) of oligonucleotide is increased in Reference Example 1 while maintaining the proportion of full length oligonucleotide at a high value equal to that in Comparative Example 1.

Similarly, as can be seen from comparison between oligonucleotide obtained using the porous resin particle of Reference Example 2 (linker addition amount: 127 μmol/g) and oligonucleotide obtained using the porous resin particle of Comparative Example 1 (linker addition amount: 150 μmol/g), the OD yield (synthesis yield) of oligonucleotide is increased in Reference Example 2 while maintaining the proportion of full length oligonucleotide at a high value equal to that in Comparative Example 1.

While the present invention has been described in detail and with reference to specific embodiments thereof, it will be apparent to one skilled in the art that various changes and modifications can be made therein without departing from the scope thereof.

This application is based on Japanese patent application No. 2007-286834 filed on Nov. 5, 2007, the entire contents thereof being hereby incorporated by reference.

Further, all references cited herein are incorporated in their entireties.

What is claimed is:

1. A method for producing a porous resin particle containing an aromatic vinyl compound-aromatic divinyl compound copolymer having a hydroxyl group, the method comprising:

dissolving a monomer mixture containing an aromatic vinyl compound, an aromatic divinyl compound and a (meth)acrylic acid ester having one hydroxyl group within the molecule thereof, and a polymerization initiator in an organic solvent to obtain a solution containing the monomer mixture and the polymerization initiator;

wherein the dissolving step is followed by suspending the solution in water in the presence of a dispersion stabilizer; and wherein the suspending step is followed by performing a suspension copolymerization, wherein a weight ratio of the organic solvent to the monomer mixture is 1 to 3, wherein an amount of the dispersion stabilizer is 0.01 to 10 weight % based on the water used for performing suspension copolymerization, and wherein the (meth)acrylic acid ester having one hydroxyl group within the molecule thereof is at least one of 4-hydroxybutyl (meth)acrylate or 2-hydroxy-3-phenoxypropyl (meth)acrylate.

2. The method according to claim 1, wherein in the monomer mixture, the (meth)acrylic acid ester having one hydroxyl group within the molecule thereof is contained in a proportion of 0.2 to 30 wt % and the aromatic divinyl compound is contained in a proportion of 2 to 30 wt % based on the monomer mixture.

* * * * *